US008190335B2

(12) United States Patent
Vik et al.

(10) Patent No.: US 8,190,335 B2
(45) Date of Patent: May 29, 2012

(54) PERFORMANCE MANAGEMENT SYSTEM FOR MULTI-MACHINE WORKSITE

(75) Inventors: Timothy A. Vik, Sparland, IL (US); Sameer S. Marathe, Naperville, IL (US); Arick M. Bakken, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1080 days.

(21) Appl. No.: 12/068,203

(22) Filed: Feb. 4, 2008

(65) Prior Publication Data

US 2009/0198422 A1 Aug. 6, 2009

(51) Int. Cl.
*G06F 7/70* (2006.01)
*G06F 11/00* (2006.01)
*G06F 19/00* (2006.01)
*G06G 7/00* (2006.01)
*G06G 7/76* (2006.01)

(52) U.S. Cl. .......................... 701/50; 370/245; 370/252

(58) Field of Classification Search .................... 701/50; 370/241, 242, 245, 252; 358/406, 468, 474, 358/475, 486, 488, 496, 504, 509; 382/168; 399/40, 223, 231, 299–301, 306
See application file for complete search history.

(56) References Cited

U.S. PATENT DOCUMENTS 4,376,298 A 3/1983 Sokol et al.
4,831,539 A 5/1989 Hagenbuch
4,985,857 A 1/1991 Bajpai et al.
5,646,844 A 7/1997 Gudat et al.
6,360,070 B1 * 3/2002 Taka et al. .................... 399/301
6,552,829 B1 * 4/2003 Maciey et al. ................ 358/509
6,778,893 B2 8/2004 Murakami et al.
6,954,689 B2 10/2005 Hanson et al.
7,042,333 B2 5/2006 Dix et al.
7,171,188 B1 1/2007 Watanabe et al.
7,283,480 B1 * 10/2007 Whittaker .................... 370/245
2003/0187554 A1 10/2003 Henry et al.
2004/0073468 A1 4/2004 Vyas et al.
2005/0081410 A1 4/2005 Furem et al.
2005/0267713 A1 12/2005 Horkavi et al.
2006/0031042 A1 2/2006 Ogura et al.
2006/0092033 A1 5/2006 Hoff et al.
2006/0229851 A1 10/2006 Cannon
2007/0142989 A1 6/2007 Koehrsen et al.

* cited by examiner

*Primary Examiner* — Christopher J. Novosad
(74) *Attorney, Agent, or Firm* — Finnegan, Henderson, Farabow, Garrett & Dunner LLP

(57) ABSTRACT

A performance management system for use a plurality of machines operating at a common worksite is disclosed. The performance management system may have at least one data acquisition module configured to monitor performance of the plurality of machines, and a controller in communication with the at least one data acquisition module. The controller may be configured to collect machine performance data from the at least one data acquisition module, and detect a performance irregularity based on the collected machine performance data. The controller may be further configured to analyze the collected machine performance data, and determine which of a machine condition, an operator condition, and a site condition is the predominant cause of the performance irregularity based on the comparison.

23 Claims, 4 Drawing Sheets

PERFORMANCE MANAGEMENT SYSTEM FOR MULTI-MACHINE WORKSITE

TECHNICAL FIELD

The present disclosure is directed to a performance management system and, more particularly, to a productivity management system for use with multiple machines operating at a common worksite.

BACKGROUND

Mining, construction, and other large scale excavating operations require fleets of digging, loading, and hauling machines to remove and transport excavated material such as ore or overburden from an area of excavation to a predetermined destination. For such an operation to be profitable, the fleet of machines must be productively and efficiently operated. Many factors can influence productivity and efficiency at a worksite including, among other things, site conditions (i.e., rain, snow, ground moisture levels, material composition, visibility, terrain contour etc.), machine conditions (i.e., age, state of disrepair, malfunction, fuel grade in use, etc.), and operator conditions (i.e., experience, skill, dexterity, ability to multi-task, machine or worksite familiarity, etc.). Unfortunately, when operations at a worksite are unproductive or inefficient, it can be difficult to determine which of these factors is having the greatest influence and should be addressed.

One approach at diagnosing worksite problems is disclosed in U.S. Patent Publication No. 2005/0267713 (the '713 publication) by Horkavi et al. published on Dec. 1, 2005. In the '713 publication, Horkavi et al. describes a data acquisition system for a machine that generates operator indexed information. The data acquisition system has a sensor disposed on the machine and configured to produce a signal indicative of an operating parameter of the machine. The data acquisition system also has an identification module disposed on the machine and configured to receive an input corresponding to a machine operator. The data acquisition system further has a controller disposed on the machine and in communication with the a sensor and the identification module. The controller is configured to record and link the signal and the input. The data acquisition system additional has a communication module disposed on the machine and in communication with the controller. The communication module is configured to transfer the recorded and linked signal and input from the controller to an off-board system. The off-board system then analyzes the recorded and linked signal and input to determine machine performance differences that can be directly attributed to particular operator control of the machine. This machine performance evaluation based on operator indexed information may allow for efficient deployment of personnel and equipment resources.

Although the method of the '713 publication may help in determining an affect of operator performance on a single machine's operation, it may lack applicability to a worksite at which multiple machines are operating. For example, if overall worksite productivity is low, the operator indexed information may do little to help distinguish if the low performance is due to a recent storm, poor machine health, or operator control.

The present disclosure is directed to overcoming one or more of the problems set forth above.

SUMMARY

In accordance with one aspect, the present disclosure is directed toward a productivity management system for use with a plurality of machines operating at a common worksite. The performance management system may include at least one data acquisition module configured to monitor performance of the plurality of machines, and a controller in communication with the at least one data acquisition module. The controller may be configured to collect machine performance data from the at least one data acquisition module, and detect a performance irregularity based on the collected machine performance data. The controller may be further configured to analyze the collected machine performance data, and determine which of a machine condition, an operator condition, and a site condition is the predominant cause of the performance irregularity based on the comparison.

According to another aspect, the present disclosure is directed toward a method of managing performance of a plurality of machines at a common worksite. The method may include collecting machine performance data associated with each of the plurality of machines, and determining a performance irregularity based on the collected machine performance data. The method may further include comparing the collected machine performance data, and determining which of a machine condition, an operator condition, and a site condition is the predominant cause of the performance irregularity based on the comparison.

DETAILED DESCRIPTION

Figure 1:
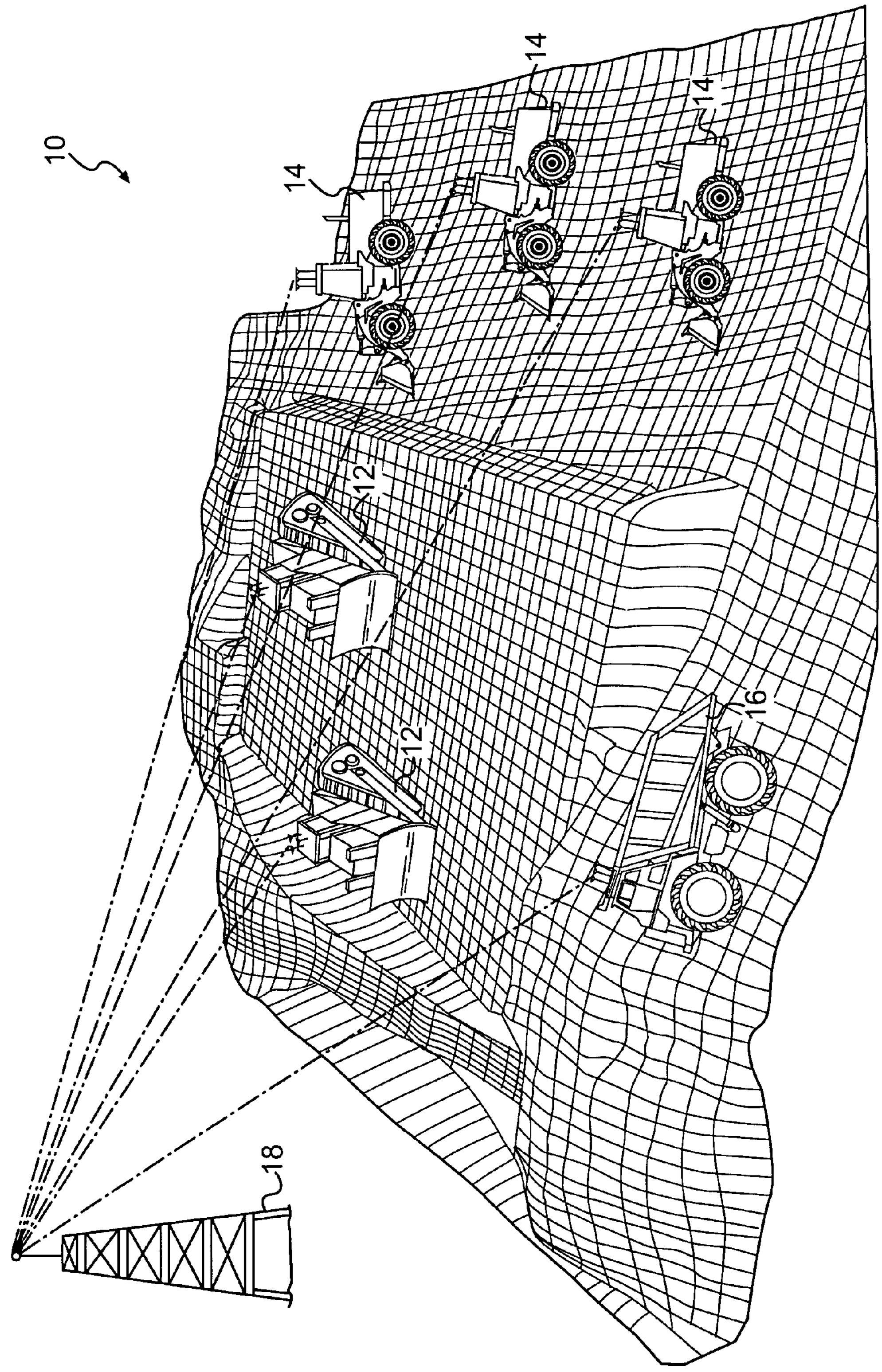
FIG. 1 is a schematic and diagrammatic representation of an exemplary disclosed worksite.

FIG. 1 shows a worksite 10 such as, for example, an open pit mining operation. As part of the mining function, excavation machines and other machines may operate at or between different locations of the worksite 10. These machines may include, among others, digging machines 12, loading machines 14, and hauling machines 16. Each of the machines at worksite 10 may be in communication with each other and/or with a central station 18 by way of wireless communication to transmit and receive operational data and instructions.

A digging machine 12 may refer to any machine that reduces material at worksite 10 for the purpose of subsequent operations (i.e. for blasting, loading, and hauling operations). Examples of digging machines 12 may include excavators, backhoes, dozers, drilling machines, trenchers, drag lines, etc. Multiple digging machines 12 may be co-located within a common area at worksite 10 and may perform similar functions. As such, under normal conditions, similar co-located digging machines 12 should perform about the same with respect to productivity and efficiency when exposed to similar site conditions.

A loading machine 14 may refer to any machine that lifts, carries, and/or loads material that has been reduced by digging machine 12 onto hauling machines 16. Examples of a loading machine 14 may include a wheeled or tracked loader, a front shovel, an excavator, a cable shovel or any other similar machine. One or more loading machines 14 may operate within common areas of worksite 10 to load reduced materials onto hauling machines 16. Under normal conditions, similar co-located loading machines 14 should perform about the same with respect to productivity and efficiency when exposed to similar site conditions.

A hauling machine 16 may refer to any machine that carries the excavated materials between different locations within worksite 10. Examples of hauling machine 16 may include an articulated truck, an off-highway truck, an on-highway dump truck, a wheel tractor scraper, or any other similar machine. Laden hauling machines 16 may carry overburden from areas of excavation within worksite 10, along haul roads to various dump sites, and return to the same or different excavation areas to be loaded again. Under normal conditions, similar co-located hauling machines 16 should perform about the same with respect to productivity and efficiency when exposed to similar site conditions.

Figure 2:
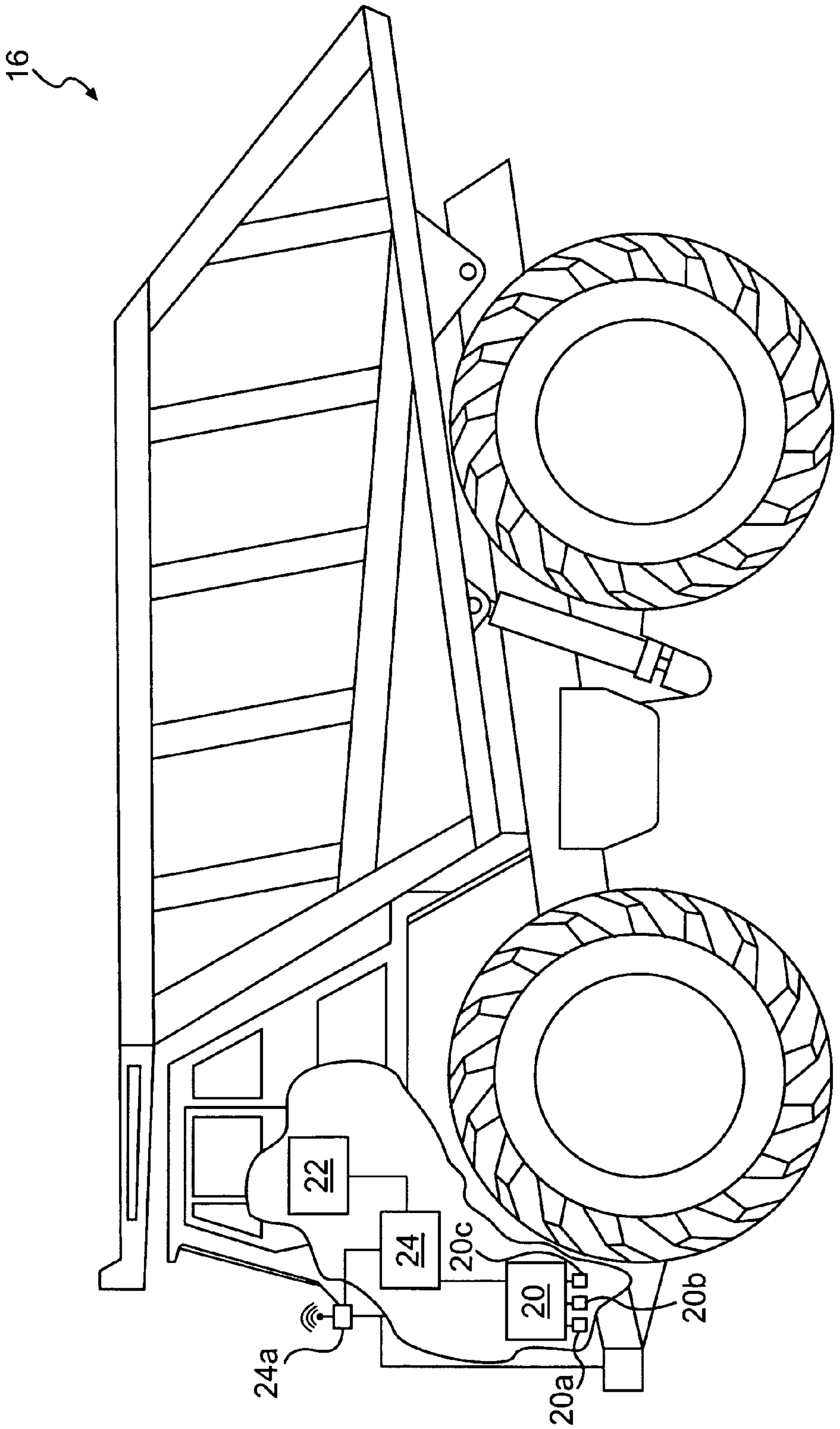
FIG. 2 is a diagrammatic illustration of an exemplary machine that may operate at the worksite of FIG. 1.

FIG. 2 shows one exemplary machine that may be operated at worksite 10. It should be noted that, although the depicted machine may embody a hauling machine 16, the following description may be equally applied to any machine operating at worksite 10. Hauling machine 16 may record and transmit data to central station 18 (referring to FIG. 1) during it's operation. This data may include machine identification data, performance data, diagnostic data, and other data, which may be automatically monitored from onboard machine 16 and/or manually observed and input by machine operators.

Identification data my include machine-specific data, operator-specific data, and/or location-specific data. Machine-specific data may include identification data associated with a type of machine (e.g., digging, loading, hauling, etc.), a make and model of machine (e.g., Caterpillar 797 OHT), a machine manufacture date or age, a usage or maintenance/repair history, etc. Operator-specific data may include an identification of a current operator, information about the current operator (e.g., a skill or experience level, an authorization level, an amount of time logged during a current shift, a usage history, etc.), a history of past operators, etc. Site-specific data may include a task currently being performed by the operator, a location authorization at worksite 10, a current location at worksite 10, a location history, a material composition at a particular area of worksite 10, etc.

Performance data may include current and historic data associated with operation of a machine at worksite 10. Performance data may include, for example, payload information, efficiency information, downtime and repair or maintenance information, etc.

Diagnostic data may include recorded parameter information associated with specific components and/or systems of the machine. For example, diagnostic data could include engine temperature, engine and/or ground speed or acceleration, fluid characteristics (e.g., levels, contamination, viscosity, temperature, pressure etc.), fuel consumption, exhaust emissions, braking conditions, transmission characteristics, air and/or exhaust pressures and temperatures, engine injection and/or ignition timings, wheel torque, rolling resistance, system voltage, etc. Some diagnostic data may be monitored directly, while other data may be derived or calculated from the monitored parameters. Diagnostic data may be used to determine performance data, if desired.

To facilitate this collection, recording, and transmitting of data from the machines at worksite 10 to central station 18 (referring to FIG. 1), each hauling machine 16 may include an onboard acquisition module 20, an operator interface module 22, and a communication module 24. Data received by acquisition and operator interface modules 20, 22 may be sent offboard to central station 18 by way of communication module 24. Communication module 24 may also be used to send instructions from central station 18 to an operator of hauling machine 16 by way of operator interface module 22. It is contemplated that additional or different modules may be included onboard hauling machine 16, if desired.

Data acquisition module 20 may include a plurality of sensors 20*a*, 20*b*, 20*c* distributed throughout hauling machine 16 and configured to gather data from various components and subsystems thereof. It is contemplated that a greater or lesser number of sensors may be included than that shown in FIG. 1. Sensors 20*a-c* may be associated with a power source (not shown), a transmission (not shown), a traction device, a work implement, an operator station, and/or other components and subsystems of hauling machine 16. These sensors may be configured to provide data gathered from each of the associated components and subsystems. Other pieces of information may be generated or maintained by data acquisition module 20 such as, for example, time of day, date, and machine location (global and/or local).

Operator interface module 22 may be located onboard hauling machine 16 for manual recording of data. The data received via interface module 22 may include observed information associated with worksite 10, machine 16, and/or the operator. For example, the observed data may include a defect in the road over which hauling machine 16 is passing, an amount of observed precipitation or visibility at worksite 10, an excessive vibration, sound, or smell of hauling machine 16, or an identity and start time of the operator. The operator may record this information into a physical or electronic log book (not shown) located within hauling machine 16 during or after a work shift. In some cases, data from operator interface module 22 may automatically be combined with data captured by acquisition module 20. For example, operator input regarding a type and criticality of a road defect may be coordinated with a geographical location of hauling machine 16, a vibration measured at the time that the observed data was input, and the name of the operator driving hauling machine 16 at the time the defect was encountered.

Communication module 24 may include any device that facilitates communication of data between hauling machine 16 and central station 18. Communication module 24 may include hardware and/or software that enables sending and/or receiving data through a wireless communication link 24*a*. It is contemplated that, in some situations, the data may be transferred to central station 18 through a direct data link (not shown), or downloaded from hauling machine 16 and uploaded to central station 18, if desired. It is also contemplated that, in some situations, the data automatically monitored by acquisition module 22 may be electronically transmitted, while the operator observed data may be communicated to central station 18 by a voice communication device, such as a two-way radio (not shown).

Communication module 24 may also have the ability to record the monitored and/or manually input data. For example, communication module 24 may include a data recorder (not shown) having a recording medium (not shown). In some cases, the recording medium may be portable, and data may be transferred from hauling machine 16 to central station 18 using the portable recording medium.

Figure 3:
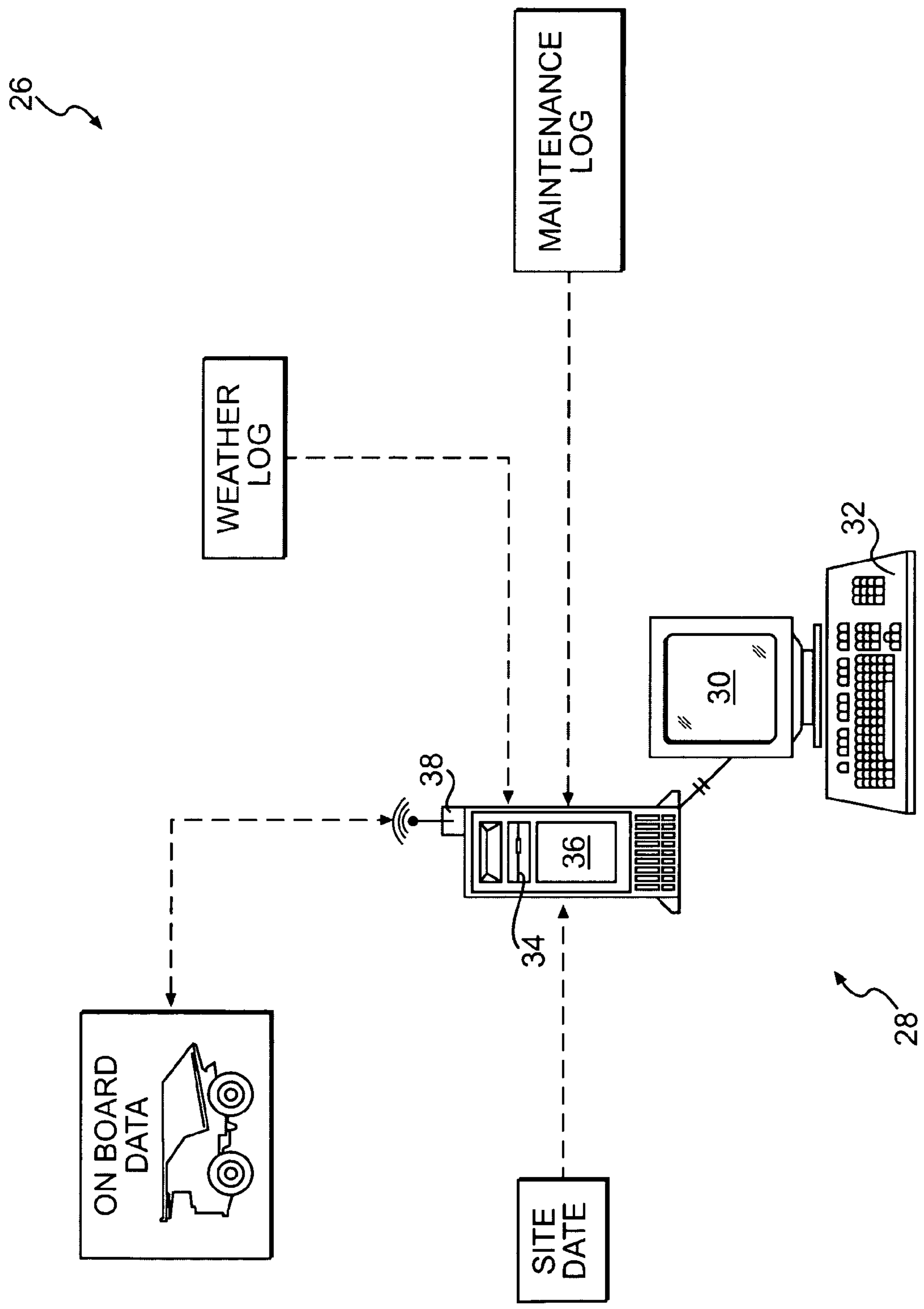
FIG. 3 is a schematic illustration of an exemplary disclosed performance management system that may be used at the worksite of FIG. 1.

FIG. 3 is a schematic illustration of a performance management system 26 configured to receive and analyze the data communicated to central station 18 from machines 12-16 and from other sources. Performance management system 26 may include a controller 28 in communication with central station 18 and configured to process data from a variety of sources and execute performance management at worksite 10. For the purposes of this disclosure, controller 28 may be primarily focused at improving productivity and efficiency of the operations performed at worksite 10.

Controller 28 may include any type of computer or a plurality of computers networked together. Controller 28 may be located proximate the mining operation of worksite 10 or may be located at a considerable distance remote from the mining operation, such as in a different city or even a different country. It is also contemplated that computers at different locations may be networked together to form controller 28, if desired.

Controller 28 may include among other things, a console 30, an input device 32, an input/output means 34, a storage media 36, and a communication interface 38. Console 30 may be any appropriate type of computer display device that provides a graphics user interface (GUI) to display results and information to operators and other users of performance management system 26. Input device 32 may be provided for operators to input information into controller 28. Input device 32 may include, for example, a keyboard, a mouse, or another computer input device. The input/output means 34 may be any type of device configured to read/write information from/to a portable recording medium. Input/output means 34 may include among other things, a floppy disk, a CD, a DVD, or a flash memory read/write device. Input/output means 34 may be provided to transfer data into and out of controller 28 using a portable recording medium. Storage media 36 could include any means to store data within controller 28 such as a hard disk. Storage media 36 may be used to store a database containing among others, historical site, machine, and operator related data. Communication interface 38 may provide connections with central station 18, enabling controller 28 to be remotely accessed through computer networks, and means for data from remote sources to be transferred into and out of controller 28. Communication interface 38 may contain network connections, data link connections, and/or antennas configured to receive wireless data.

Data may be transferred to controller 28 electronically or manually. Electronic transfer of data includes the transfer of data using the wireless capabilities or the data link of communication interface 38. Data may also be electronically transferred into controller 28 through a portable recording medium using input/output means 34. Manually transferring data into controller 28 may include communicating data to a control system operator in some manner, who may then manually input the data into controller 28 by way of, for example, input device 32. The data transferred into controller 28 may include machine identification data, performance data, diagnostic data, and other data. The other data may include for example, weather data (current, historic, and forecast), machine maintenance and repair data, site data such as survey information or soil test information, and other data known in the art.

Controller 28 of performance management system 26 may analyze the data and present results to a user thereof by way of console 30. The results may include a productivity and/or an economic analysis (e.g., efficiency) for each machine, for each category of machines (i.e., for digging machines 12, for loading machines 14, or for hauling machines 16), for co-located machines, for each operator associated with machines 12-16, and/or for worksite 10 as a whole. The results may be indexed according to time, for example, according to a particular shift or a particular 24-hr period.

The results of the analysis could be in the form of detailed reports or they could be summarized as a visual representation such as, for example, with an interactive graph. The results may be used to show a historical performance or a current performance of the machines operating at worksite 10. Alternatively or additionally, the results could be used to predict a progression of operations at worksite 10, and to estimate a time before the productivity and/or efficiency of a particular machine operator, group of machines, or worksite 10 exceeds or falls below a preset limit. That is, the results may indicate an estimated time before a performance irregularity occurs. Similarly, controller 28 may flag the user at the time of the irregularity occurrence or during the analysis stage when the irregularity is first detected.

For the purposes of this disclosure, a performance irregularity can be defined as a deviation from a historical or expected productivity and/or efficiency related parameter that is monitored, calculated, or otherwise received by performance management system 26. In one embodiment, an amount of deviation required for the irregularity classification may be set by a machine operator, a user of performance management system 26, a business owner, or other responsible entity. In some situations, the performance irregularity could be indicative of a system breakdown, malfunction, or management oversight that should be addressed to ensure continued operation and profitability of worksite 10. In other situations, the performance irregularity may be indicative of a site condition over which little control may be exercised, but that may still be accommodated to improve profitability of worksite 10.

Based on the analysis, when a performance irregularity has been detected (or a performance irregularity is impending), controller 28 may compare the results in search for a cause of the irregularity. For example, controller 28 may determine which of a site condition, a machine condition, and an operator condition had, is having, or will have the greatest effect on the irregularity (i.e., which condition is the predominant cause of the irregularity). For the purpose of this disclosure, a site condition can include a weather condition, a material condition, a terrain condition, or another site condition known in the art. A machine condition may include a machine age, a machine maintenance condition, a machine state of repair, or another similar condition. An operator condition may include an experience level of the operator, a skill level of the operator, an ability to multi-task, machine or worksite familiarity or another operator related condition. Controller 28 may be configured to determine the most likely cause of the irregularity (i.e., the one of site condition, machine condition, or operator condition having the greatest effect on the irregularity) by analyzing (i.e., comparing) the collected data according to certain indices (i.e., by trending the data).

In one example, controller 28 may analyze or trend the collected data according to general machine identification. Specifically, controller 28 may compare the productivity or efficiency of one group of machines to another related group of machines (e.g., the productivity or efficiency of digging machines 12 to loading machines 14 that are loading the material reduced by the digging machines 12). Based on the comparison, if both groups of related machines are experiencing similar irregularities, controller 28 may conclude that a site condition is most likely affecting both groups of machines. That is, both groups of machines are probably being subjected to similar conditions outside their control that are causing the poor performance. In contrast, however, if only one group of machines, for example only loading machines 14, are experiencing the performance irregularity, controller 28 may conclude that the irregularity is probably due to one particular group of the machines or operators of that particular group of machines. For example, it may be that the digging machines 12 are not adequately reducing the material for optimum removal by the associated loading machines 14. As a result, even though the digging machines

12 may be highly productive, the loading machines 14 may, as a group, experience lower relative productivity and/or efficiency.

In a related example, controller 28 may further analyze or trend the collected data according to the identification of each individual machine within a single grouping of machines. That is, controller 28 may trend the collected data according to those machines that are working in a specific area of worksite 10 and performing similar tasks (e.g., controller 28 may compare the productivity or efficiency of each co-located digging machine 12 from the previous example). Based on this comparison, if multiple similar co-located machines are experiencing the same or similar performance irregularities, controller 28 may conclude and indicate to the user of performance management system 26 that a site condition is most likely having the greatest influence on the performance irregularity. That is, if co-located machines performing a similar task are all performing poorly, the cause of the poor performance is probably not due to a particular operator or a particular machine within the group. Therefore, the cause is most likely influenced by a site condition that is being experienced by all machines and all operators of the group.

However, if only a small number, for example one, of the machines at a particular location is experiencing the performance irregularity, controller 28 may conclude that a site condition is probably not the cause of the poor performance. Instead, when controller 28 determines that fewer than a threshold number of the machines are experiencing the performance irregularity, a machine condition or an operator condition may be indicated to the user of performance management system 26 as having the greatest influence on the performance irregularity that has occurred.

In another example, controller 28 may analyze or trend the collected data according to operator identification. Specifically, controller 28 may compare the productivity or efficiency of each machine within a group of commonly tasked and similar machines according to who is operating those machines within a given time period (i.e., within a given shift). When controller 28 determines, based on the operator trending, that multiple operators of the same machine are experiencing the same or similar performance irregularities, controller 28 may indicate to the user of performance management system 26 that a machine condition is having the greatest influence on the performance irregularity and that the performance irregularity is not specific to a particular operator.

However, when controller 28 determines, based on the operator trending, that fewer than a threshold number of operators of the same machine are experiencing the performance irregularity, controller 28 may indicate that a machine condition is most likely not the cause of the performance irregularity. Instead, when controller 28 determines that fewer than a threshold number of operators are experiencing the performance irregularity, an operator condition may be indicated to the user of performance management system 26 as having the greatest influence on the performance irregularity.

In addition to indicating the condition having the greatest influence on the occurrence of a performance irregularity, the results may also include a recommended list of actions to be performed based on the cause of the irregularities. For example, based on a site condition determination, controller 28 may recommend that certain site related operations (e.g., digging or blasting) be performed differently or that the machines operating at worksite 10 be equipped differently (e.g., loading machines 14 being equipped with a wider or deeper bucket to accommodate improperly reduced material) to better accommodate the site conditions. In another example, based on a machine condition, controller 28 may recommend that one or more of the machines be maintained differently, operated differently, or replaced to improve productivity and/or efficiency. Similarly, in yet another example, based on an operator condition, controller 28 may recommend additional training or changes to personnel resource distribution.

Figure 4:
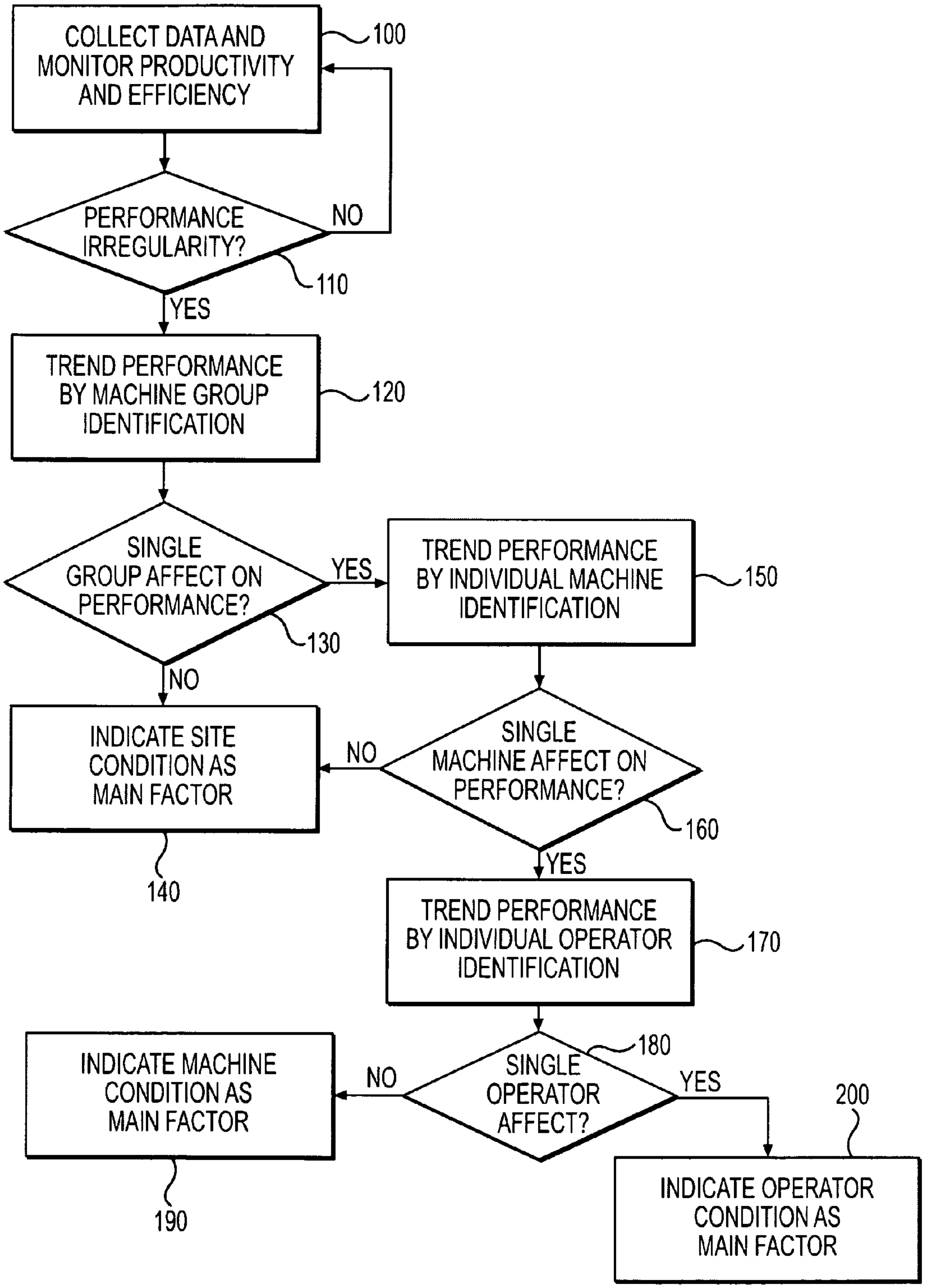
FIG. 4 is a flowchart depicting an exemplary operation that may be executed by the performance management system of FIG. 3.

FIG. 4 is a flowchart depicting an exemplary operation performed by controller 28 in determining which condition may have the greatest influence on a performance irregularity. FIG. 4 will be discussed in more detail below to further illustrate performance management system 26 and its operation.

Industrial Applicability

The disclosed system may provide an efficient method of managing worksite performance. In particular, the disclosed method and system may manage performance at a worksite by analyzing data measured from onboard machines at the worksite and by trending the data according to predetermined indices. The operation of performance management system 26 will now be explained.

As illustrated in FIG. 4, during operation at worksite 10, data from various sources including digging, loading, and hauling machines 12-16 and operators thereof, may be collected by performance management system 26 and analyzed for productivity and efficiency (Step 100). Part of this analysis may including indexing or trending the data according to different criteria, for example, according to a type of machine, machine identification, operator, and time. Based on this analysis, controller 28 may determine if a performance irregularity exists (Step 110). An irregularity may exist if performance (i.e., productivity or efficiency) of worksite 10, a group of machines at worksite 10, a particular machine, or a particular operator is other than expected. If no irregularity exists, control may return to step 100.

However, if controller 28 determines that a performance irregularity does exist, controller 28 may compare the collected data to determine the major factor or most likely cause of the irregularity. In doing so, controller 28 may trend the collected data according to machine group identification (Step 120). For example, controller 28 may trend productivity according to a type of machine such as a digging machine 12 or a loading machine 14. If the productivity of the digging machines 12 is about the same as or corresponds with the productivity of the associated loading machines 14 that are working in conjunction with the digging machines 12 (or an expected productivity), it can be concluded that the productivity is not significantly impacted at the group level (Step 130). In such a situation, it can be concluded and indicated by controller 28 via console 30 that the main condition affecting the observed performance irregularity is a site condition.

However, if a significant difference does exist in the performance of one group as compared to another or to an expected performance level, additional comparisons may be made. For example, controller 28 may trend the collected data according to the identification of individual machines within a single group (Step 150). That is, within the group of loading machines 14, the performance of individual machines may be trended and compared to determine if individual machines are having a negative impact on productivity or efficiency (step 160). If no affect at the individual machine level is observed, controller 28 may once again conclude that the performance irregularity is most likely being negatively affected by a site condition (Step 140).

In contrast, however, if the affect of one machine on the performance irregularity can be observed, additional comparisons may be made (Step 170). That is, controller 28 may trend the collected data according to particular operators of the individual machines to determine if the operators are having an affect on the irregularity (Step 180). If, after trending the data according to operator, no significant effect can be observed, controller 28 may conclude that the performance irregularity is most affected by the condition of a particular machine (Step 190). However, if an effect can be observed after operator trending, controller 28 may instead conclude that the performance irregularity is most affected by an operator condition.

Because the disclosed performance management system may compare data from multiple sources at a worksite level, a machine group level, a machine level, and an operator level, performance irregularities may be easily recognized. Based on the performance trends, factors affecting irregularities may be identified and accommodated. In this manner, worksite, machine, and operator performance may be improved.

It will be apparent to those skilled in the art that various modifications and variations can be made in the disclosed performance management system without departing from the scope of this disclosure. Other embodiments will be apparent to those skilled in the art from consideration of the specification and practice of the performance management system. It is intended that the specification and examples be considered as exemplary only, with a true scope being indicated by the following claims.

What is claimed is:

1. A performance management system for use with a plurality of machines operating at a common worksite, the performance management system comprising:
- at least one data acquisition module configured to monitor performance of the plurality of machines; and
- a controller in communication with the at least one data acquisition module and being configured to:
  - collect machine performance data from the at least one data acquisition module;
  - detect a performance irregularity based on the collected machine performance data;
  - analyze the collected machine performance data; and
  - determine which of a machine condition, an operator condition, or a site condition is the predominant cause of the performance irregularity based on the analysis.

2. The performance management system of claim 1, wherein:
- the controller is configured to trend the machine performance data according to machine identification; and
- when the controller determines, based on the trending, that multiple of the plurality of machines are experiencing the performance irregularity, the controller is configured to indicate that the site condition is the predominant cause of the performance irregularity.

3. The performance system of claim 2, wherein the controller is configured to trend the machine performance data according to location within the common worksite and according to a currently performed task.

4. The performance management system of claim 1, wherein:
- the controller is configured to trend the machine performance data according to machine identification; and
- when the controller determines, based on the trending, that fewer than a threshold number of the plurality of machines are experiencing the performance irregularity, the controller is configured to indicate that one of the machine condition or the operator condition is the predominant cause of the performance irregularity.

5. The performance management system of claim 4, wherein:
- the controller is configured to trend the machine performance data according to operator; and
- when the controller determines, based on the operator trending, that multiple operators of the same one of the plurality of machines are experiencing the performance irregularity, the controller is configured to indicate that the machine condition is having the greatest influence on the performance irregularity.

6. The performance management system of claim 4, wherein:
- the controller is configured to trend the machine performance data according to operator; and
- when the controller determines, based on the operator trending, that fewer than a threshold number of machine operators of the same one of the plurality of machines are experiencing the performance irregularity, the controller is configured to indicate that the operator condition is the predominant cause of the performance irregularity.

7. The performance management system of claim 1, wherein the performance irregularity is related to productivity.

8. The performance management system of claim 1, wherein the performance irregularity is related to efficiency.

9. The performance management system of claim 1, wherein the plurality of data acquisition modules are located onboard the plurality of machines.

10. The performance management system of claim 1, wherein the controller is configured to trend the collected machine performance data with respect to time.

11. The performance management system of claim 1, wherein the site condition is one of a weather condition, a material condition, or a terrain condition.

12. The performance management system of claim 1, wherein the machine condition is one of a machine age condition, a machine maintenance condition, or a machine repair condition.

13. The performance management system of claim 1, wherein the operator condition is one of an experience level or a skill level.

14. The system of claim 1, wherein the worksite is an open pit mining operation, and the plurality of machines are from a group including digging machines, loading machines, and hauling machines.

15. A performance management system, comprising:
- a plurality of machines co-located at a common worksite; a plurality of data acquisition modules located onboard the plurality of machines to monitor machine performance; and
- a controller in communication with each of the plurality of data acquisition modules and being configured to:
  - collect machine performance data from each of the plurality of data acquisition modules;
  - detect low productivity based on the collected machine performance data;
  - index the collected machine performance data according to at least a machine identification and an operator identification; and
  - determine which of a machine condition, an operator condition, or a site condition is the predominant cause of the low productivity based on the indexing.

16. The performance management system of claim 15, wherein:
- the performance irregularity is related to one of productivity or efficiency;

the site condition is one of a weather condition, a material condition, or a terrain condition;

the machine condition is one of a machine age condition, a machine maintenance condition, or a machine repair condition; and the operator condition is one of an experience level or a skill level.

17. The system of claim 15, wherein the worksite is an open pit mining operation, and the plurality of machines are from a group including digging machines, loading machines, and hauling machines.

18. A method of managing performance of a plurality of machines at a common worksite, comprising:

collecting machine performance data associated with each of the plurality of machines;

determining a performance irregularity based on the collected machine performance data;

comparing the collected machine performance data; and determining which of a machine condition, an operator condition, and a site condition is the predominant cause of the performance irregularity based on the comparison.

19. The method of claim 18, wherein:

comparing the collected machine performance data includes trending the machine performance data according to machine identification; and when it is determined, based on the trending, that multiple of the plurality of machines are experiencing similar performance irregularities, the method includes indicating that the site condition is having the greatest influence on the performance irregularities.

20. The method of claim 18, wherein:

comparing the collected machine performance data includes trending the machine performance data according to machine identification; and when it is determined, based on the trending, that fewer than a threshold number of the plurality of machines are experiencing the performance irregularity, the method includes indicating that one of the machine condition or the operator condition is the predominant cause of the performance irregularities.

21. The method of claim 20, wherein:

comparing the collected machine performance data further includes trending the machine performance data according to operator; and when it is determined, based on the operator trending, that multiple operators of the same one of the plurality of machines are experiencing similar performance irregularities, the method includes indicating that the machine condition is having the greatest influence on the performance irregularities.

22. The method of claim 20, wherein:

comparing the collected machine performance data further includes trending the machine performance data according to operator; and when it is determined, based on the operator trending, that fewer than a threshold number of machine operators of the same one of the plurality of machines are experiencing the performance irregularity, the method includes indicating that the operator condition is having the greatest influence on the performance irregularity.

23. The method of claim 18, wherein the worksite is an open pit mining operation, and the plurality of machines are from a group including digging machines, loading machines, and hauling machines.

* * * * *